(12) United States Patent
Liang et al.

(10) Patent No.: US 11,899,555 B2
(45) Date of Patent: Feb. 13, 2024

(54) SYSTEM FOR APPLICATION ENGAGEMENT COMPOSITE INDEX

(71) Applicant: Microsoft Technology Licensing, LLC, Redmond, WA (US)

(72) Inventors: Hongwei Liang, Redmond, WA (US); Muskan Kukreja, Redmond, WA (US); Sandipan Ganguly, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/733,256

(22) Filed: Apr. 29, 2022

(65) Prior Publication Data

US 2023/0350777 A1    Nov. 2, 2023

(51) Int. Cl.
*G06F 11/34* (2006.01)
*G06N 20/00* (2019.01)
*G06F 11/30* (2006.01)

(52) U.S. Cl.
CPC ........ *G06F 11/3438* (2013.01); *G06F 11/302* (2013.01); *G06N 20/00* (2019.01)

(58) Field of Classification Search
CPC .... G06F 11/3438; G06F 11/302; G06N 20/00
See application file for complete search history.

(56) References Cited

U.S. PATENT DOCUMENTS

| | | | | |
|---|---|---|---|---|
| 10,496,721 | B2 * | 12/2019 | Saxena | G06F 16/337 |
| 2014/0122245 | A1 * | 5/2014 | Qu | G06Q 30/0269 |
| | | | | 705/14.66 |
| 2014/0335480 | A1 * | 11/2014 | Asenjo | G06Q 10/06 |
| | | | | 434/107 |
| 2017/0098122 | A1 * | 4/2017 | el Kaliouby | G06V 40/171 |
| 2017/0357847 | A1 * | 12/2017 | Jabri | G06T 7/73 |
| 2018/0121479 | A1 * | 5/2018 | Saxena | G06F 16/9535 |
| 2018/0350015 | A1 | 12/2018 | Gordon et al. | |
| 2019/0028556 | A1 * | 1/2019 | Ben-Harrush | H04L 67/306 |

(Continued)

OTHER PUBLICATIONS

Gougeh et al., "Quantifying User Behaviour in Mutltisensory Immesive Experiences", IEEE International Conference on Metrology for Extended Reality, Artificial Intelligence and Neural Engineering (MetroXRAINE), Oct. 26, 2022.*

(Continued)

*Primary Examiner* — Todd L Barker
(74) *Attorney, Agent, or Firm* — Schwegman Lundberg & Woessner, P.A.

(57) ABSTRACT

A method may include accessing, from a data store, telemetry data for an application, the telemetry data identifying actions executed by the application for a set of users of the application; retrieving an engagement index for the application using the telemetry data based on an engagement index profile, the engagement index profile identifying a selection of actions and a set of calculation dimensions; and presenting a user interface, the user interface including: a first portion identifying the selection of actions; a second portion identifying the set of calculation dimensions; a third portion identifying an original value of an action of the selection of actions with respect to a dimension in the set of calculation dimensions; and a fourth portion identifying a weighted composite value of the action with respect to set of calculation dimensions.

20 Claims, 7 Drawing Sheets

(56) References Cited

U.S. PATENT DOCUMENTS

2019/0130769 A1* 5/2019 Rodriguez Bravo .... G07C 5/08
2019/0294485 A1   9/2019 Kukreja et al.
2020/0204466 A1   6/2020 Moore et al.

OTHER PUBLICATIONS

Hong et al., "A Cooperative Method for Supervised Learning in Spiking Neural Networks", 14th International Conference on Computer Supported Cooperative Work in Design, Apr. 14, 2010.*
"International Search Report and Written Opinion Issued in PCT Application No. PCT/US2023/012760", dated Jun. 1, 2023, 10 Pages.

* cited by examiner

| Modern way of work in Software Application | # of Docs per user | | # of Actions per users | | Modern Action Composite Measure amx_action_index 80day | | Spikes/Dips of Composite Measure ACME Platform/Apps |
|---|---|---|---|---|---|---|---|
| | ACME | US-Tech Median | ACME | US-Tech Median | ACME | US-Tech Median | ACME |
| Modern Authoring Actions | 26 (▲ 62%) | 33 (▼ -46%) | 0.89 (▲ 14%) | 1.49 (▲ 16%) | 1.91 (▲ 7%) | 1.8 (▼ -5%) | Excel ▲ 11% Veg Excel ▲ 52% Agtged ▲ 47% |
| Reusing docs from Cloud | 11 (▲ 9%) | 5.2 (▲ 11%) | 1.08 (▼ -22%) | 1.24 (▲ 5%) | 1.56 (▲ 12%) | 1.2 (▲ 5%) | Excel ▲ 21% Mac Excel ▲ 25% Veg with PPT ▲ 35% ▼ -10% |
| Cloud Existing docs | 17 (▲ 62%) | 9 (▼ -9%) | 1.05 (▲ 39%) | .92 (▲ 9%) | 1.74 (▲ 11%) | 1.4 (▲ 4%) | Mac/Aple Web ▲ 22% / ▲ 21% Veg PPT ▲ 46% Agtged ▲ 54% |
| Collaboration in Office docs | 0.23 (▲ 21%) | 0.08 (▲ 14%) | 0.57 (▲ 16%) | 0.20 (▲ 16%) | 0.19 (▲ 25%) | 0.03 (▲ 19%) | Not Applicable |
| Modern Interactions (comments +@copy) | 0.29 (▲ 22%) | 0.07 (▲ 20%) | 0.81 (▲ 34%) | 0.23 (▲ 24%) | 0.12 (▲ 28%) | 0.08 (▲ 20%) | Not Applicable |
| Intelligence Services (Rep) | Not Applicable | | 2.3 (▼ -64%) | .2 (▲ 34%) | 0.15 (▼ -7%) | 0.5 (▲ 22%) | Web ▼ -1% Veg Excel ▲ 47% Agtged ▲ 15% |
| Emails Attachment | 22 (▲ 5%) | 29 (▼ -12%) | 39 (▲ -2%) | 95 (▼ -12%) | 1.46 (▲ 2%) | 2.1 (▼ -5%) | Web ▼ -3% Excel ▼ -2% PPT ▲ 12% |

SYSTEM FOR APPLICATION ENGAGEMENT COMPOSITE INDEX

BACKGROUND

Telemetry data from applications has a number of uses for software developers. For example, telemetry data may indicate how often users use certain features of the software or what led to unexpected behavior of an application. When an application has hundreds of features and millions of users the computing resources required to collect and analyze the data quickly can become unsustainable.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be performed by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

In various examples described herein, user interfaces are described as being presented to a computing device. Presentation may include data transmitted (e.g., a hypertext markup language file) from a first device (such as a Web Server) to the computing device for rendering on a display device of the computing device via a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all of the portions/elements are displayed simultaneously. Unless indicated as such, the use of "presenting a user interface" does not infer either one of these options.

Additionally, the elements and portions are sometimes described as being configured for a certain purpose. For example, an input element may be described as being configured to receive an input string. In this context, "configured to" may mean presentation of a user interface element that is capable of receiving user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query with respect to a database.

Modern computer applications include many different features, and the applications are constantly evolving by adding new features. Often, users may not even know a feature has been added. Tracking the use of application features may help developers determine if the new features are being used at an expected rate, and if not, may indicate a feature needs to be more prominent in a user interface. When users are not actively engaging with new features, the users may stop using the application, generate unnecessary customer support calls, or switch to a different application entirely.

In various examples, application features may include actions taken by a user within an application, including but not limited to, creating a new file, zooming in, changing page layout, printing, cloud-based saving, local saving, screen sharing, etc.

Tracking feature engagement presents a multitude of problems. For example, each application has a different set of features, which means making a common engagement metric is difficult. Conversely, creating a unique engagement metric for every new application results in a waste of resources—such as personnel, financial, time, and information technology infrastructure.

Additionally, not all features should be treated with equal weight in an engagement metric. There are many features that are common across applications within the same class. For example, a document processor may include features to change a font, switch a view, etc. Then, there may be features that are unique to an application or reflect a more modern usage of the application class. For example, there may be a feature in the word processor that lets a user that is editing the document notify another user in a comment, a feature that allows sharing of the document from within the application, or an automatic translation feature.

Additionally, there may be a distinction between tracking feature engagement of common features (e.g., save, new) vs modern features (e.g., real-time collaborative editing). If an engagement metric counted the common features and modern features equally it may be that the common features would dominate the metric and limited insight would be available for the modern features. Another problem with counting all the features is the possible introduction of bias towards features that are heavily correlated.

Yet another problem in creating an engagement metric is how to measure a feature's use. For example, a feature may be multidimension, and if certain dimensions are ignored, the engagement metric may derive biased, or even incorrect, measurements. A dimension may be the way in which use of a feature is measured such as any use of the feature per file, number of uses per file, percentage of users that have used the feature in the past week, etc.

As discussed in more detail below, the system described herein provides a software tool to help collect, monitor, and visualize engagement of application features across multiple dimensions and at a number of different levels of granularity to overcome the challenges described above. For example, an unbounded engagement index may be generated based on feature use data. The engagement index may be generated to favor preferred features (e.g., modern), disfavor through negative weighting, unpreferred features (e.g., traditional, common) features, and ignore other features. The engagement index may incorporate multiple dimensions of each feature such as action/events, file/page, session, % user, active days per month, etc., to sensitively quantify the engagement level and distinguish differences. The components of the engagement index may have weights algorithmically assigned based on each feature's contribution, importance, or correlation to certain key performance metrics (e.g., revenue), or user-based engagement (e.g., monthly/daily active status, retention status, etc.).

Finally, the index is generalizable and versatile enough to work for a variety of business-to-consumer (B2C) and business-to-business (B2B) software as a service (SaaS), decomposable to allow a user to drill down to derive detailed insights, and robust enough that an anomaly on single feature engagement or dimension does not cause a huge disturbance on the index.

Figure 1:
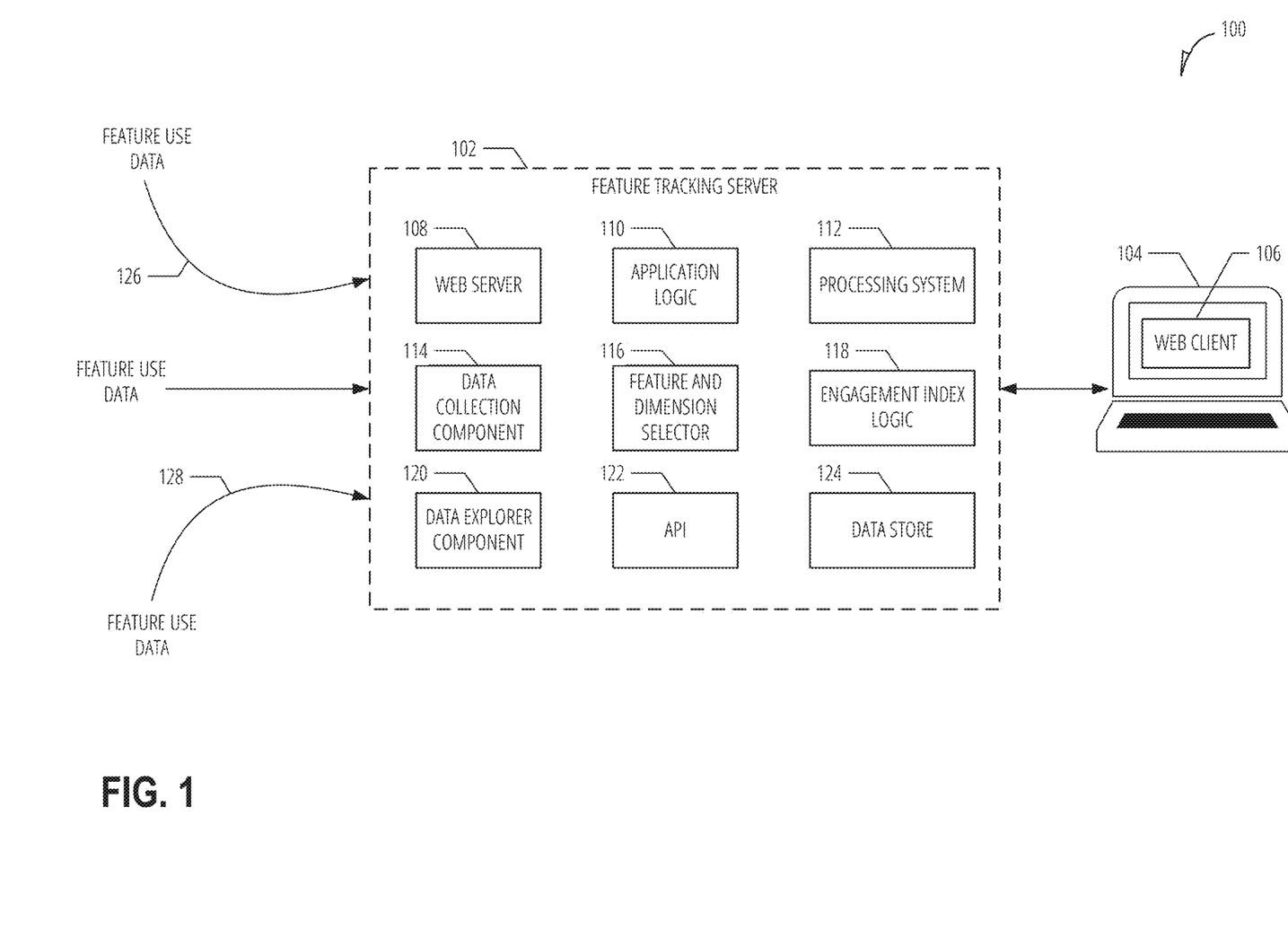
FIG. 1 is an illustration of components of a client device and a feature tracking server, according to various examples.

FIG. 1 is an illustration of components of a client device and a feature tracking server, according to various examples. FIG. 1 includes a feature tracking server 102, a client device 104, a web client 106, a web server 108, an application logic 110, a processing system 112, a data collection component 114, a feature and dimension selector 116, an engagement index logic 118, a data explorer component 120, an API 122, a data store 124, a data connection 126, and a data connection 128.

Client device 104 may be a computing device which may be, but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

Client device 104 and feature tracking server 102 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks, or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet. Client device 104 and feature tracking server 102 may communicate data over the network. The data may include a request from client device 104 for presentation of a table, chart, or other visualization of an engagement index for a set of users.

In some examples, the communication may occur using an application programming interface (API) such as API 122. An API provides a method for computing processes to exchange data. A web-based API (e.g., API 122) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a database (e.g., data store 124).

API calls may be used to send feature use data to feature tracking server 102 from other computing devices that are using an application. For example, application telemetry may be collected (after receiving user permission) that indicates when a feature of an application is used and send it to feature tracking server 102 over data connection 126 and data connection 128. The feature use data may be batched such that not every feature use is sent at the time of use. Instead, an application may collect usage data and send according to a schedule or trigger event (e.g., upon close of the application). Further detail on the data collection is discussed below in the context of data collection component 114.

Feature tracking server 102 is illustrated as set of separate elements (e.g., components, logic, etc.). However, the functionality of multiple elements may be performed by a single element. An element may represent computer program code that is executable by processing system 112. The program code may be stored on a storage device (e.g., data store 124) and loaded into a memory of the processing system 112 for execution. Portions of the program code may be executed in a parallel across multiple processing units (e.g., a core of a general purpose computer processor, a graphical processing unit, an application specific integrated circuit, etc.) of processing system 112. Execution of the code may be performed on a single device or distributed across multiple devices. In some examples, the program code may be executed on a cloud platform (e.g., MICROSOFT AZURE® and AMAZON EC2®) using shared computing infrastructure.

Feature tracking server 102 may include web server 108 for data exchanges with client device 104 (and user devices that are running applications) via web client 106. Although generally discussed in the context of delivering webpages via the Hypertext Transfer Protocol (HTTP), other network protocols may be utilized by web server 108 (e.g., File Transfer Protocol, Telnet, Secure Shell, etc.). A user may enter in a uniform resource identifier (URI) into web client 106 (e.g., the INTERNET EXPLORER® web browser by Microsoft Corporation or SAFARI® web browser by Apple Inc.) that corresponds to the logical location (e.g., an Internet Protocol address) of web server 108. In response, web server 108 may transmit a web page that is rendered on a display device of a client device (e.g., a mobile phone, desktop computer, etc.).

Additionally, web server 108 may enable a user to interact with one or more web applications provided in a transmitted web page. The web page may be rendered using a web client that be part of a stand-alone application in various examples. A web application may provide user interface (UI) components that are rendered on a display device of client device 104. The user may interact (e.g., select, move, enter text into) with the UI components, and, based on the interaction, the web application may update one or more portions of the web page. A web application may be executed in whole, or in part, locally on client device 104. The web application may populate the UI components with data from external sources or internal sources (e.g., data store 124) in various examples.

The web application may be executed according to application logic 110. Application logic 110 may use the various elements of feature tracking server 102 to implement the web application. For example, application logic 110 may issue API calls to retrieve or store data from data store 124 and transmit it for display on client device 104. Similarly, data entered by a user into a UI component may be transmitted using API 122 back to the web server 108. Application logic 110 may use other elements (e.g., data collection component 114, feature and dimension selector 116, engagement index logic 118, application logic 110, etc.) of feature tracking server 102 to perform functionality associated with the web application as described further herein. Although much of this disclosure describes the functionality of application server 102 with respect to web application, similar functionality may be used in a standalone application that communicates with application server 102.

The web application may include multiple aspects. For example, one aspect may involve user management of which features and dimensions should be tracked for a given application. Another aspect may explore data that has been collected based on the first aspect.

Data store 124 may store data that is used by feature tracking server 102. Data store 124 is depicted as singular element but may in actuality be multiple data stores. The specific storage layout and model used in by data store 124 may take a number of forms—indeed, a data store 124 may utilize multiple models. Data store 124 may be, but is not limited to, a relational database (e.g., SQL), non-relational database (NoSQL) a flat file database, object model, document details model, graph database, shared ledger (e.g., blockchain), or a file system hierarchy. Data store 124 may store data on one or more storage devices (e.g., a hard disk, random access memory (RAM), etc.). The storage devices may be in standalone arrays, part of one or more servers, and may be located in one or more geographic areas.

Among other items, data store 124 made store classifications (e.g., preferred vs unpreferred) for features of an application and weights for calculating an engagement index for the application. There may be multiple entries for a single application. For example, one user of future tracking server 102 may be looking to track engagement of a first set of features and a second user may be looking at a different set of features. Data store 124 may also include data collected by data collection component 114 for calculating the engagement index.

In various examples, data collection component 114 may collect data from devices that have used/are using applications tracked by feature tracking server 102. For example, consider data connection 128 is connected to a user computer that is running a word processing application. Periodically, feature tracking server 102 may request, or the user computer may push, telemetry data for the application. In some examples, the telemetry data may already have been collected for other purposes (e.g., debugging, performance metrics, etc.) and reside in data store 124. No matter the origin, the telemetry data may include one or more of the following types of information: date/time, enterprise identifier, user identifier, action (e.g., feature) name & type, associated document/file identifier, platform (e.g., web, operating system, browser type), device geographic location, device internet protocol address, device identifier, and device type (e.g., tablet, mobile phone, laptop, desktop, etc.).

Feature and dimension selector 116 may be used to classify each type of action (e.g., feature) in an application. The classifications are generally discussed in binary terms as being preferred or unpreferred, but more classification levels may be used without departing from the scope of this disclosure. To assist with classification, feature tracking server 102 may present a user interface that presents a list of each feature with a checkbox (or other UI element) to select the classification. In various examples, a feature has a default selection of preferred or unpreferred.

Feature and dimension selector 116 may also include user interfaces configured to receive user selection of the features to include in the engagement index. Accordingly, a user may not need to make a classification of every presented feature as preferred or unpreferred. Instead, they may just classify the features that they want included as part of the calculated engagement index.

Feature and dimension selector 116 may also present user interfaces configured to receive the dimensions for each of the selected features. Each feature may have different dimensions in various examples. For example, one feature may use the percentage of users that have used the feature at least once in past week and averages uses per day whereas a second feature may use the number of uses per file per day. Feature and dimension selector 116 may present a set of radio buttons for available dimensions next to a label of a feature in the engagement index for selection by the user.

Engagement index logic 118 may compute an engagement index for an application according to selections made by the user using feature and dimension selector 116. Engagement index logic 118 may compute multiple component engagement index values that aggregate to a topline engagement index value.

For example, consider a company manager using feature tracking server 102 to see the engagement index value of a new application to determine if the company's employees are using the modern features of the application. The company manager may further wish to see the engagement index separated out by platform and device type. Accordingly, there may be a topline engagement index value for the application. The company manager may further look at the component engagement index values for tablets or mobile phones. A more thorough discussion of how the engagement index is computed is discussed in the context of FIG. 2 and FIG. 3.

Data explorer component 120 may present a set of interactive visualizations that are configured to present the calculated engagement index to a user. Visualizations may include, but are not limited to, tables, trend line graphs, stacked column charts, etc. A user may also segment (e.g., using drop down menus) the engagement index according to time, platform, geographic location, job title (e.g., using a user ID for lookup), or device type, in various examples. A user may also compare an engagement index with another set of users. For example, the engagement index for the hypothetical company above may be compared with a group of anonymized companies or an industry average. An example of a user interface for exploring an engagement index is presented in FIG. 4.

Figure 2:
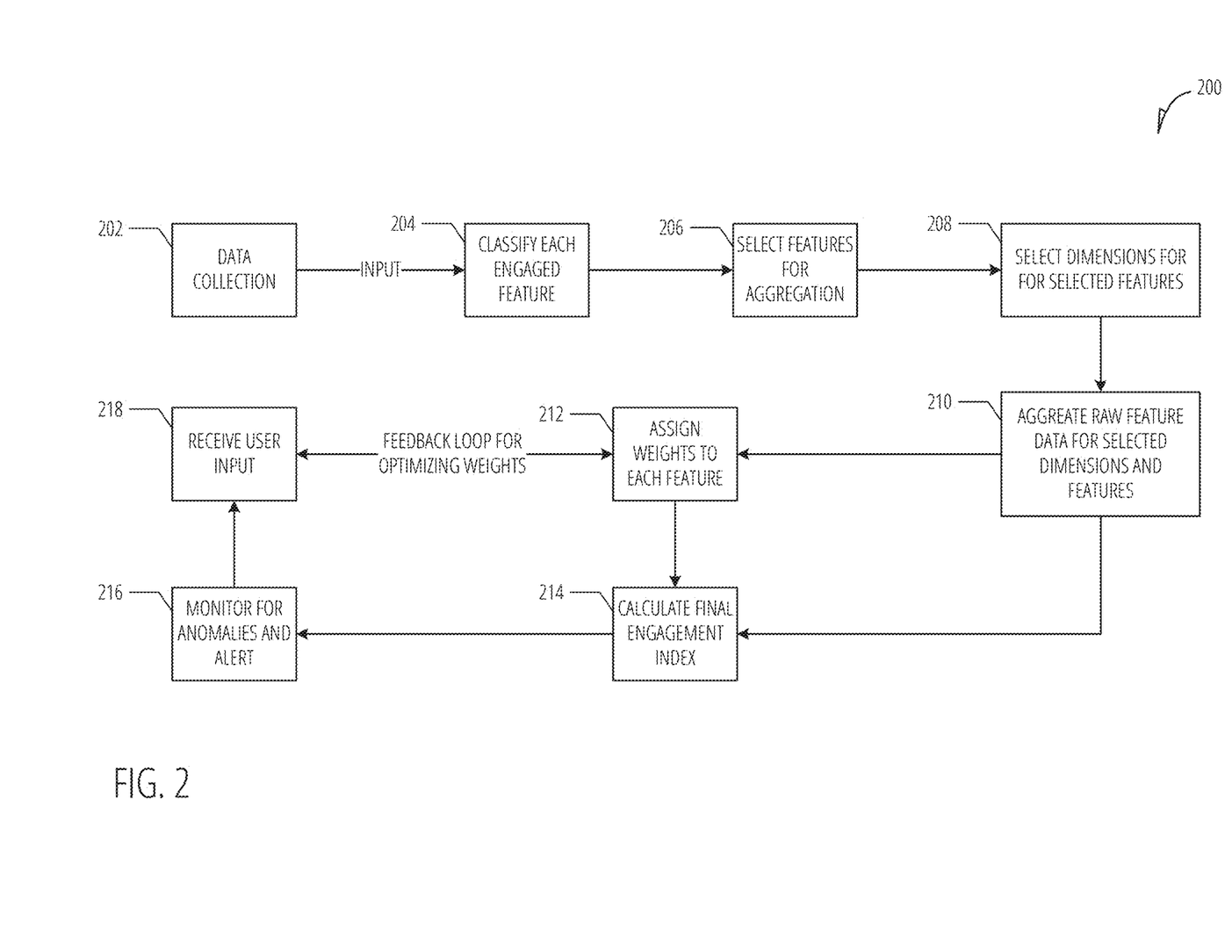
FIG. 2 is a flowchart diagram illustrating a set of subprocesses for generating an engagement index, according to various examples.

FIG. 2 is a flowchart diagram illustrating a set of subprocesses for generating an engagement index, according to various examples. FIG. 2 includes a data collection subprocess 202, a feature classification subprocess 204, a feature selection subprocess 206, a dimension selection subprocess 208, a raw aggregation subprocess 210, a weight assignment subprocess 212, an engagement index calculation subprocess 214, a monitoring and alert subprocess 216, and a user feedback subprocess 218. These subprocesses may performed using one of more of the elements of feature tracking server 102 as described in more detail above.

Different users of feature tracking server 102 may use an engagement index for different reasons. For example, the administrators of feature tracking server 102 may be a software developer, and the user may be a product development manager who wishes to track engagement for the various applications that the software developer has created. In another example, a user may be a company operations manager trying to determine engagement among different groups of employees. Data store 124 may store profiles for the different users and the parameters for the engagement index.

Figure 3:
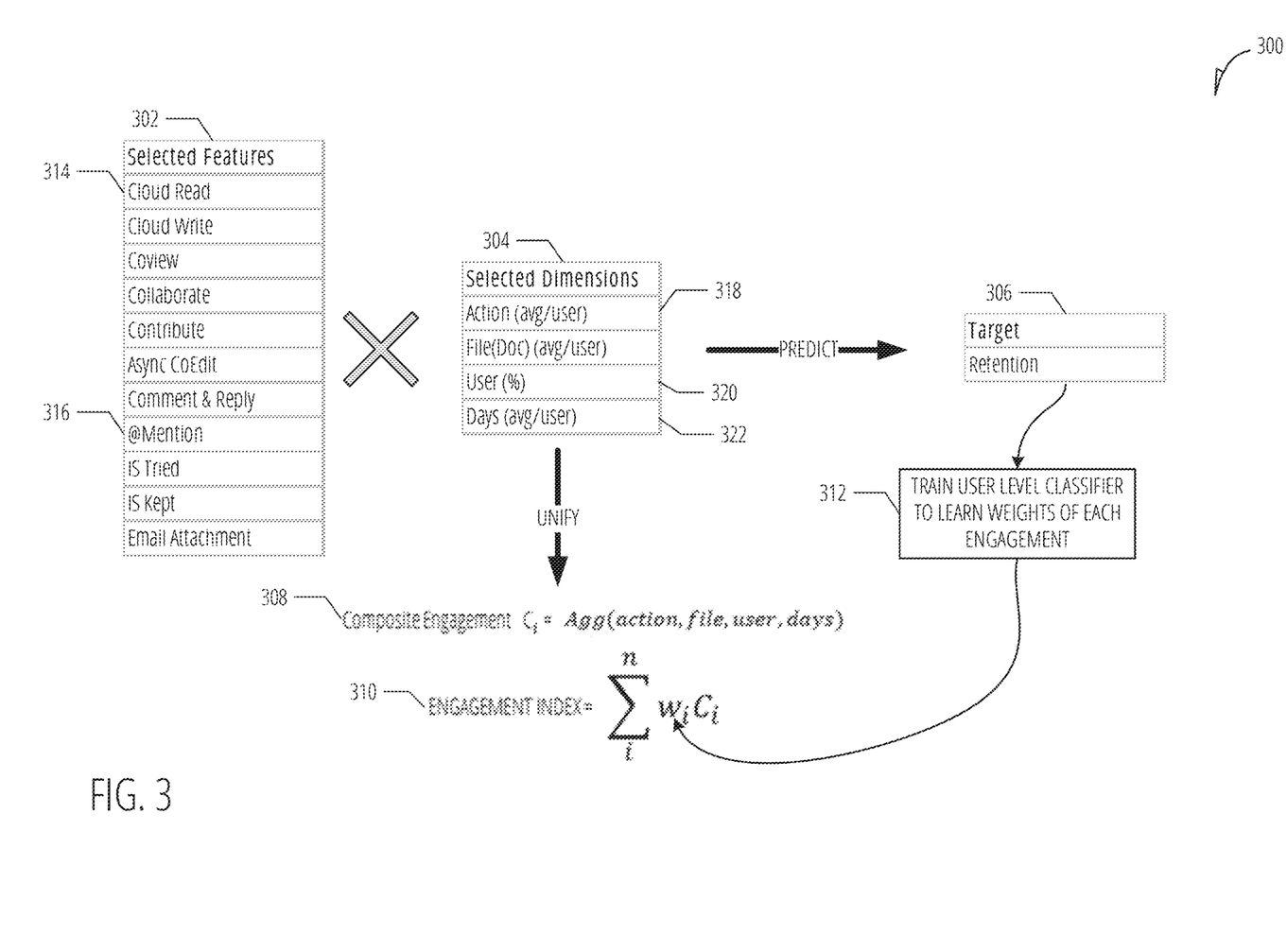
FIG. 3 is a visual representation of calculating an engagement index, according to various examples.

A running example for FIG. 2 and FIG. 3 is described in which the subprocesses are used for generating an engagement index for a suite of applications (e.g., a word processing application, a presentation application, an email client, etc.). As indicated previously, feature tracking server 102 allows for multiple levels of granularity. Thus, each of the individual applications may have its own respective engagement index that is then aggregated with the other applications to generate the engagement index for the suite of applications.

Feature tracking server 102 may present a series of user interfaces to receive data from a user with respect to feature classification subprocess 204, feature selection subprocess 206, and dimension selection subprocess 208. For example, data collection subprocess 202 may collect action data from the suite of applications as described above with respect to data collection component 114. In various examples, an engagement index profile is stored in data store 124 for the selections and classifications made by the user.

As part of feature classification subprocess 204, application server 102 may present a list of the features present in the action data collected by data collection subprocess 202 (e.g., using feature and dimension selector 116). Some applications may share features while others may be unique to a specific application. The list may identify which applications the feature is applicable for, in various examples.

A user may classify if each (or a subset) of the presented actions are preferred or unpreferred for the engagement index. A preferred action is one in which a positive weight (e.g., more than zero) is applied in the engagement index, and an unpreferred action is given a negative weight (e.g., less than zero). Feature selection subprocess 206 may present (e.g., using feature and dimension selector 116) user interfaces to indicate which of the classified features to include in the engagement index. At dimension selection subprocess 208, a user may select which dimension metrics to include in the engagement index for each of the selected features.

Raw aggregation subprocess 210, weight assignment subprocess 212, and engagement index calculation subprocess 214 are discussed in the context of FIG. 3.

FIG. 3 is a visual representation of calculating an engagement index, according to various examples. FIG. 3 includes selected features 302, selected dimensions 304, target goal 306, composite engagement formula 308, engagement index formula 310, level classifier 312, feature 314, feature 316, dimension 318, dimension 320, and dimension 322.

Selected features 302 may be the features selected according to feature selection subprocess 206. Similarly, selected dimensions 304 may include the dimensions selected by a user in dimension selection subprocess 208. With reference back to FIG. 2, raw aggregation subprocess 210 may calculate a raw composite engagement score for each of the selected features across its respective selected dimensions. For example, feature 314 may correlate with a cloud read action. According to an engagement index profile, the user may have selected to use dimension 318 and dimension 320 for feature 314, and then selected to use dimension 318, dimension 320, and dimension 322 for feature 316.

Thus, raw aggregation subprocess 210 may sum the average number of uses of a cloud write per user (e.g., dimension 318) and percentage of users that have used a cloud write (e.g., dimension 320) from data in data store 124 to determine the component value for feature 314. A similar process may be used for each of the features in selected features 302 according to their respective selected dimensions.

With reference back to FIG. 2, weight assignment subprocess 212 may be used to assign positive weights to each of the component values for the preferred features and negative weights for each of the unpreferred features. Weights may be assigned in a variety of ways. For example, a user may assign weights directly. In other examples, a supervised learning algorithm (e.g., linear regression, k-nearest neighbor, Naïve Bayes, Support Vector Machines, Neural Networks) may be used (e.g., level classifier 312). The supervised learning algorithm may be trained using labeled data sets that are generated from action data as stored in data store 124 correlated with a target goal (e.g., target goal 306) such as customer retention (e.g., a continued subscription to an application).

The weights may be assigned such that the overall engagement index is uncapped. Thus, there may be no standardization of the engagement index such that the weights have to add up to some number (e.g., one).

After the weights are assigned and stored as part of the engagement index profile, engagement index calculation subprocess 214 may be used to determine the final engagement index (e.g., using engagement index logic 118). As depicted in FIG. 3, engagement index formula 310 may include applying the respective weights determined by weight assignment subprocess 212 to each respective feature. Then each weighted value may be aggregated to determine the overall engagement index.

The engagement index may be calculated periodically (e.g., daily, weekly, monthly) such that it can be tracked over a period of time. Monitoring and alert subprocess 216 may be used to track changes in the engagement index, and if there is a change over some threshold, (e.g., 10% or a nominal value change exceeding 50) an alert may be sent. The alert may be transmitted to the user that created in the engagement index and/or an engineer to diagnose if there is a problem. For example, a sudden drop in engagement may indicate a server failure, a bad network connection, etc. Additionally, users at user feedback subprocess 218 may indicate that one or more weights of the engagement index should be modified—sometimes overriding weights as assigned by level classifier 312.

Figure 4:
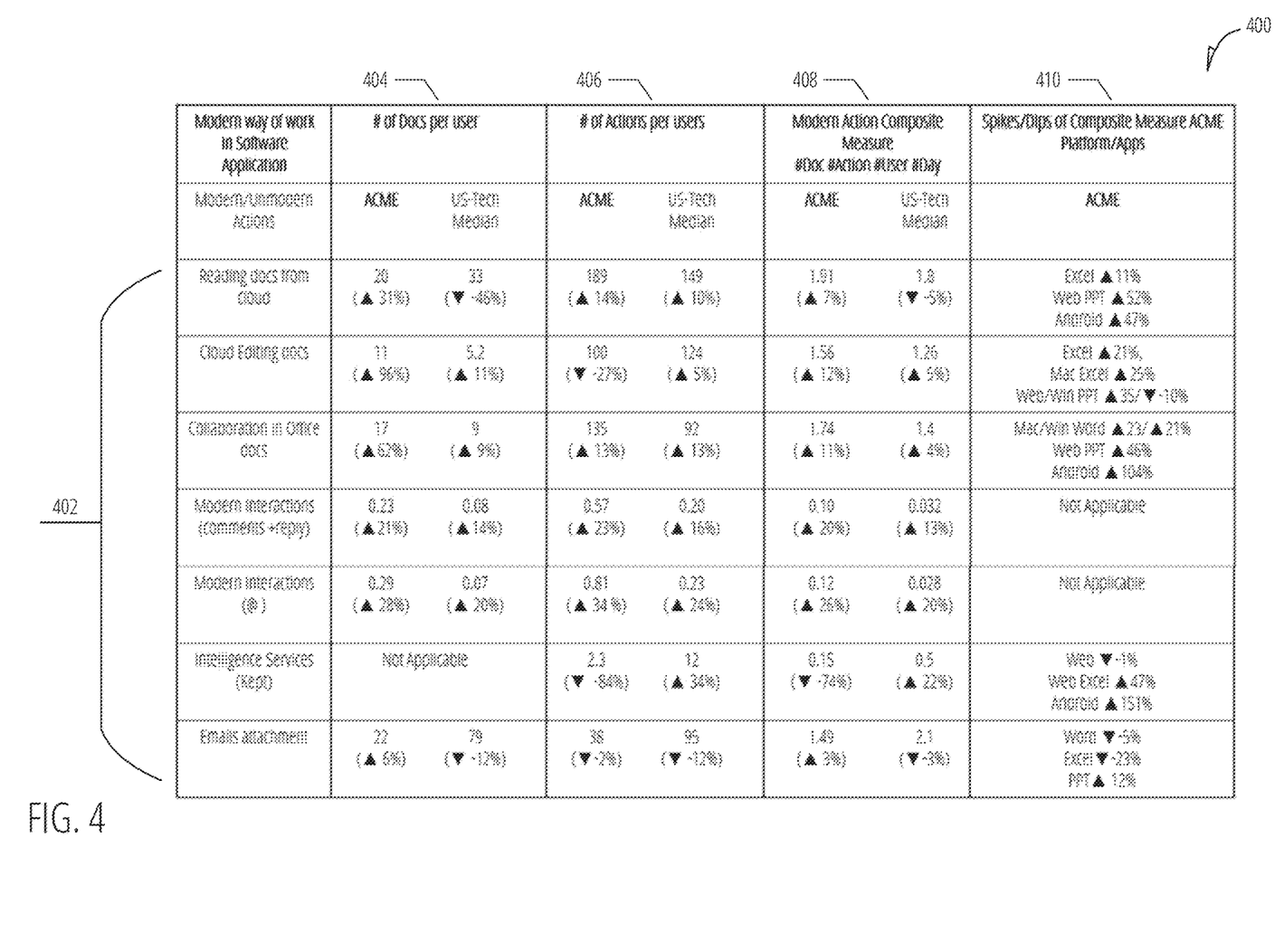
FIG. 4 is a user interface depicting components of an engagement index, according to various examples.

FIG. 4 is a user interface 400 depicting components of an engagement index, according to various examples. User interface 400 includes features 402, dimension 404, dimension 406, composite value 408, and trend column 410.

User interface 400 may be presented to a user of feature tracking server 102 upon receiving a selection of an engagement index profile. The precise layout and types of information presented in user interface 400 are just one example and other layouts, number of columns, etc., may be used without departing from the scope of this disclosure.

Furthermore, although not illustrated as such, user interface 400 may include a number of visualization, filtering, and sorting controls. For example, a user interface element may be presented that lists all of the dimensions that are used in the engagement index—whereas user interface 400 includes just two—and add or remove columns accordingly. Another control may allow a user to sort by biggest percentage change or nominal value. Another control may show or hide one or more comparison groups (and select the comparison group). For example, user interface 400 includes a comparison group of a US-Tech median. Another control may indicate the period of time for trendline comparison (e.g., change week-to-week, month-to-month, quarter-to-quarter, etc.).

The values in user interface 400 may be based on the most recent calculated engagement index compared with a previous engagement index. For example, consider the reading docs from cloud feature in features 402. Within the dimension 404 column, it can be seen that the raw count of reading from cloud actions within the engagement index calculation period was "20" for fictional company ACME, which is a 31% increase over the prior engagement index calculation period. For dimension 406, the raw value is "189".

Moving to composite value 408, user interface 400 indicates that the composite value for the reading docs from cloud feature is 1.91. The aggregated composite value may be the value for a feature after the weights have been assigned and applied to the individual dimension values in various examples.

Finally, trend column 410 may indicated trend values for each feature according to platform/specific applications. For example, for the cloud editing docs feature there was a 35% increase in the composite value for the web platform, but a 10% decrease for the MICROSOFT WINDOWS® platform. In various examples, a user may indicate which platforms/applications to include in trend column 410. In various examples, only those platforms/application the exceed a threshold change between needed engagement index periods are included in trend column 410.

Formatting and styling may be applied to the entries of user interface 400 to quickly highlight information to a user. For example, preferred features may have a green background cell color whereas unpreferred features may have a red background cell color. In various examples, the text for the engagement index of a company (e.g., ACME) is more emphasized (e.g., in black or bold) than the text of the values for a comparison group (e.g., in a grey). Additionally, graphical objects (e.g., up or down arrows) may be used to indicate the trend direction. The graphical objects may use different colors depending on if they are increasing or decreasing.

Figure 5:
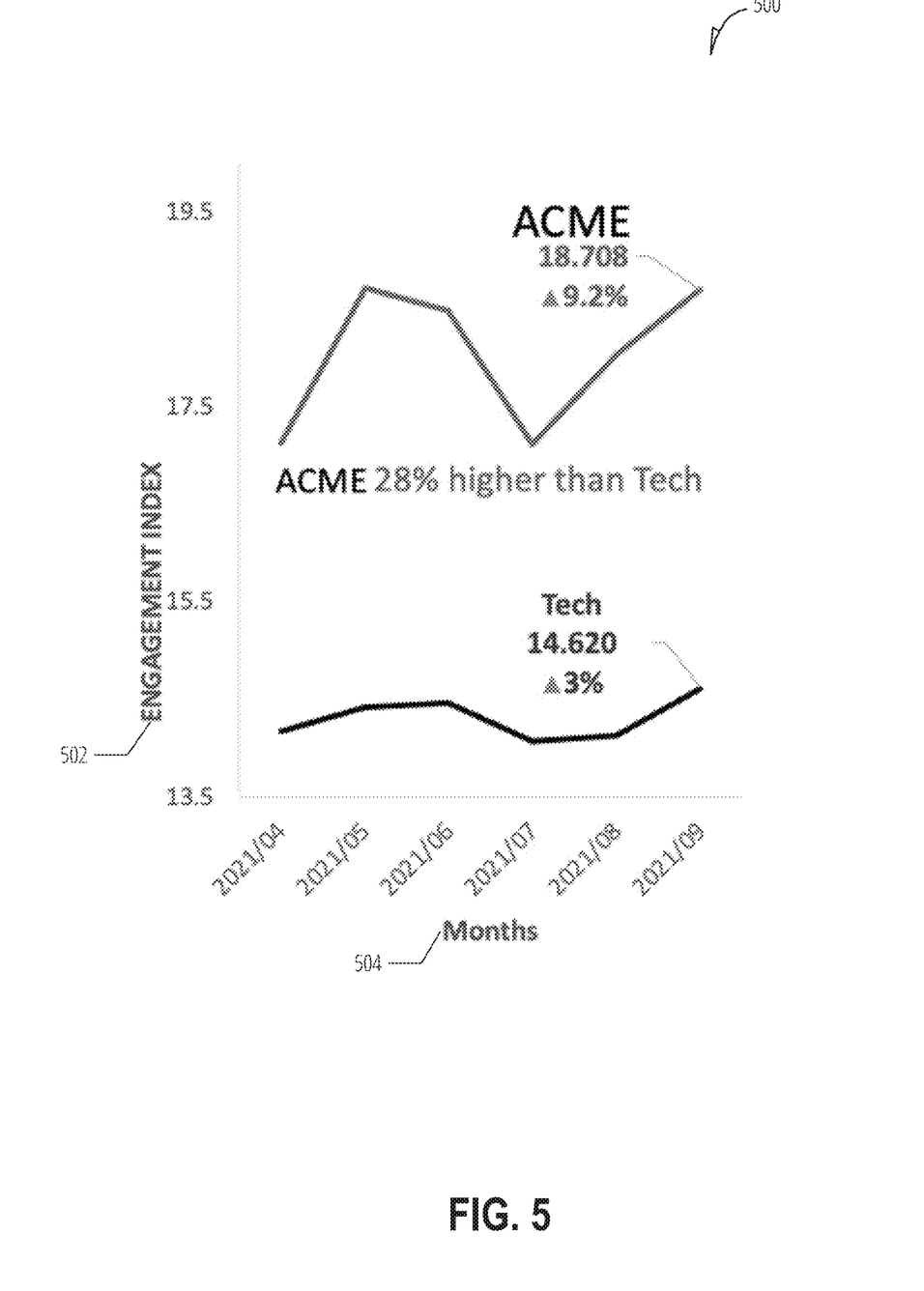
FIG. 5 is a trend graph of an engagement index, according to various examples.

FIG. 5 is a trend line graph 500 of an engagement index, according to various examples. Although depicted as a line graph, other graph types may be used, and more comparison groups may be used as well. Trend line graph 500 has engagement index axis 502 with month axis 504. The engagement index values may be based on the total engagement index (e.g., as calculated according to engagement index formula 310) over a period of months. FIG. 5 allows a user to quickly see the overall picture of engagement of a suite of applications whereas FIG. 4 may be used to drill down and see why the overall engagement index is going up or down.

Figure 6:
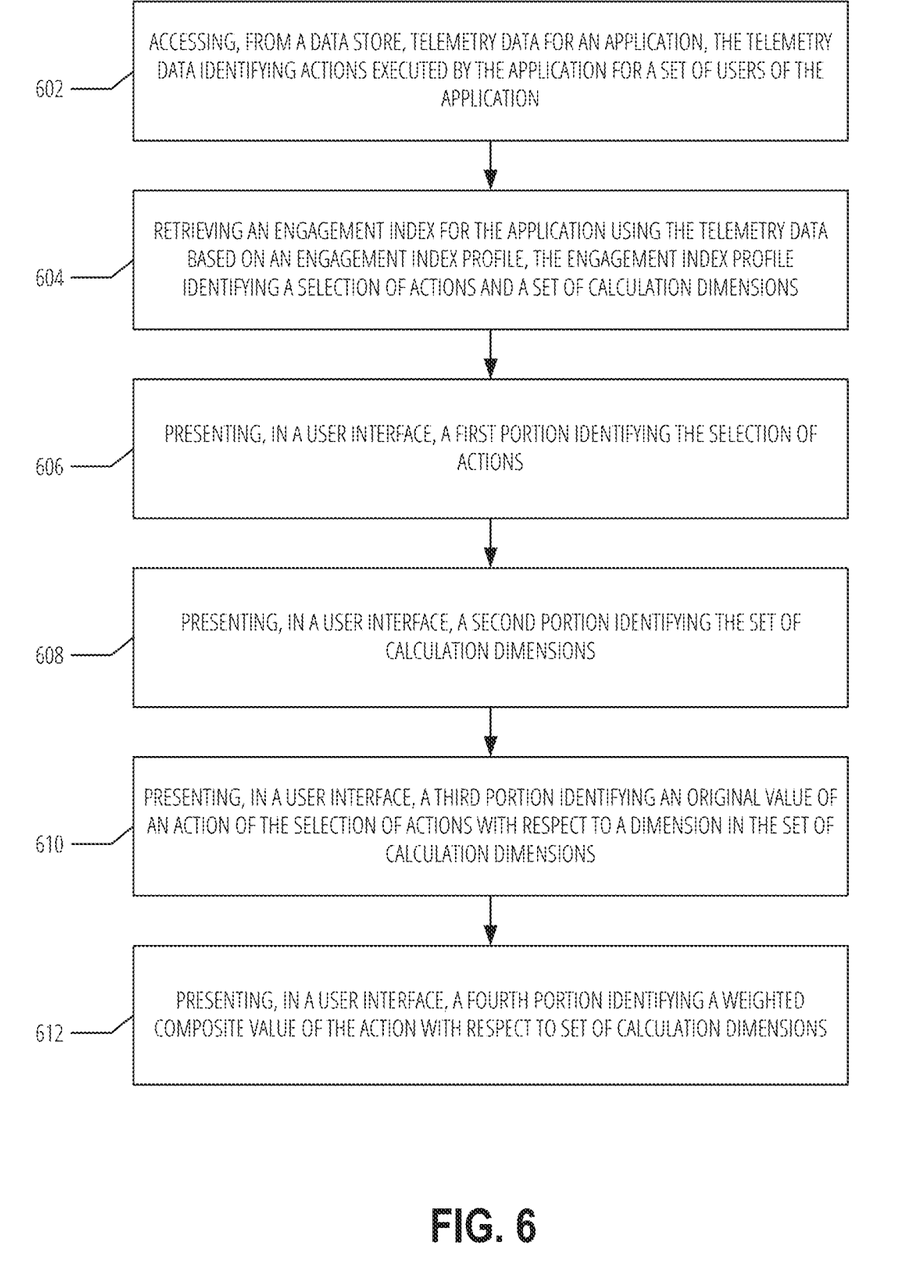
FIG. 6 is a flowchart illustrating method operations, according to various examples.

FIG. 6 is a flowchart illustrating a method, according to various examples. The method is represented as a set of blocks that describe operations 602-612 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 6. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At operation 602, in various examples, the method may include accessing, from a data store, telemetry data for an application, the telemetry data identifying actions executed by the application for a set of users of the application. The telemetry data may have been collected according to data collection subprocess 202 in various examples.

At operation 604, in various examples, the method may include retrieving an engagement index for the application using the telemetry data based on an engagement index profile, the engagement index profile identifying a selection of actions and a set of calculation dimensions. The selection of action and calculation dimensions may have stored the engagement index profile according to feature classification subprocess 204, feature selection subprocess 206, and dimension selection subprocess 208. For example, certain actions may be classified as preferred and other unpreferred. Positive weights may be assigned to preferred actions and negative weights may be assigned to unpreferred actions. In some examples, the weights may be based on a supervised learning algorithm.

At operation 606, in various examples, the method may include presenting a user interface with a first portion identifying the selection of actions. The first portion may a list of the selection of actions such as features 402. Preferred actions may be presented in one color and the unpreferred actions a separate, different color.

At operation 608, in various examples, the method may include presenting a user interface with a second portion identifying the set of calculation dimensions. The calculation dimensions may be presented as columns such dimension 404 and dimension 406.

At operation 610, in various examples, the method may include presenting a user interface with a third portion identifying an original value of an action of the selection of actions with respect to a dimension in the set of calculation dimensions. The original value may be the raw data from the data store for the action and dimension.

At operation 612, in various examples, the method may include presenting a user interface with a fourth portion identifying a weighted composite value of the action with respect to set of calculation dimensions. This may be the values such as appear in composite value 408 in FIG. 4.

The user interface may also illustrate engagement index values for other groups as well as present trend data for the engagement index.

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 7:
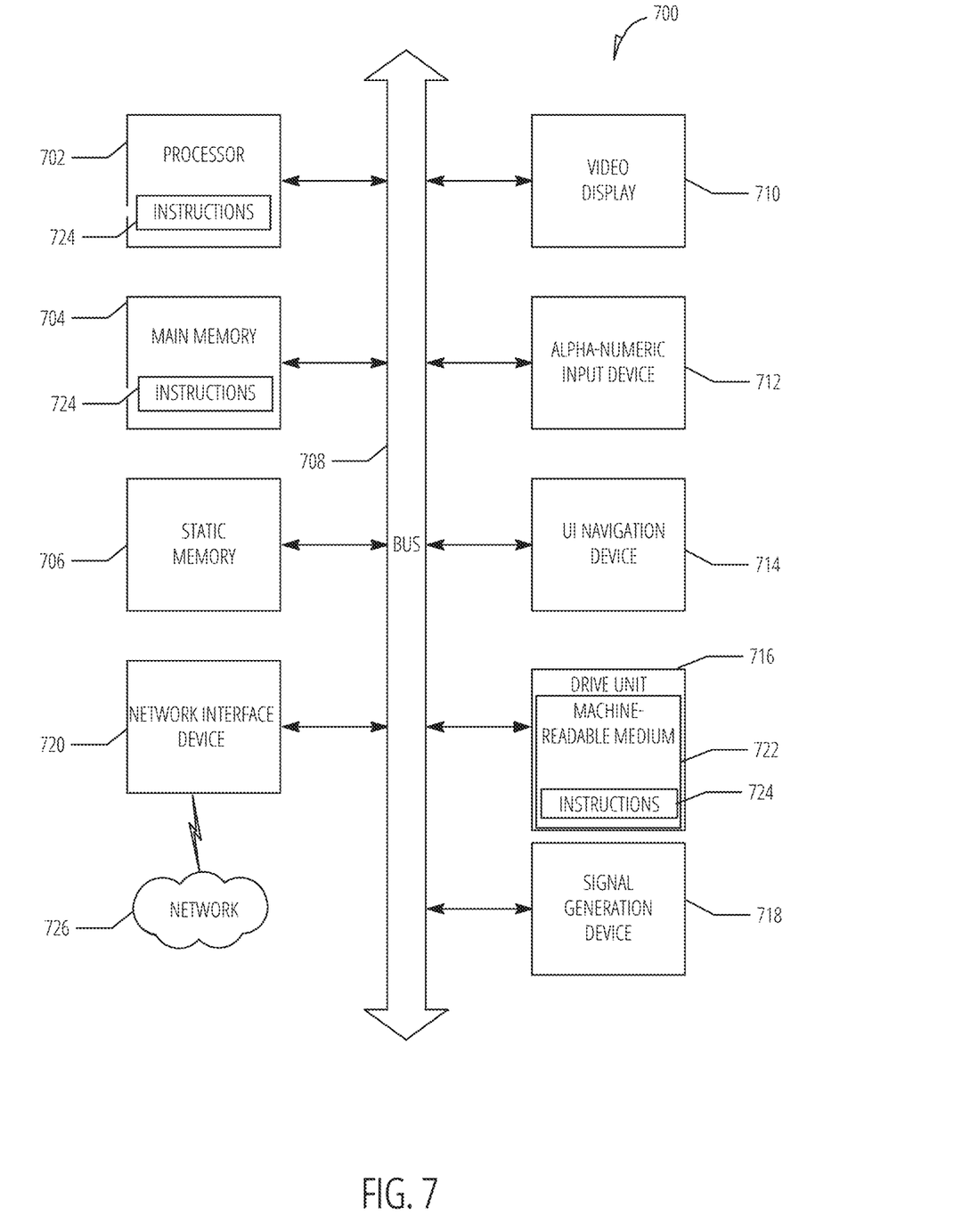
FIG. 7 is a block diagram illustrating an example machine upon which any one or more of the techniques (e.g., methodologies) discussed herein may be performed, according to various examples.

FIG. 7 is a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, 4G LTE/LTE-A, 5G, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

The invention claimed is:

1. A system comprising:
   at least one processor;
   a storage device comprising instructions, which when executed by the at least one processor configure the at least one processor to perform operations comprising:
   accessing, from a data store, telemetry data for an application installed at a set of user systems, the telemetry data identifying actions executed by the application, at a respective user system, for a set of users of the application;
   retrieving an engagement index for the application using the telemetry data based on an engagement index profile, the engagement index profile identifying a selection of actions and a set of calculation dimensions; and
   presenting a user interface, the user interface including:
   a first portion identifying the selection of actions;
   a second portion identifying the set of calculation dimensions for the set of users of the application;
   a third portion identifying an original value of an action of the selection of actions with respect to a dimension in the set of calculation dimensions for the set of users of the application; and
   a fourth portion identifying a weighted composite value of the action with respect to a set of calculation dimensions for the set of users of the application.

2. The system of claim 1, wherein a first action in the selection of actions is classified as a preferred action and a second action of the selection of action is classified as an unpreferred action.

3. The system of claim 2, wherein the engagement index is calculated based on applying a positive weight to dimension calculations for the first action and applying a negative weight to dimension calculations for the second action.

4. The system of claim 3, wherein a value of the positive weight is based on an output from a supervised learning algorithm.

5. The system of claim 2, the first action is formatted in the first portion with a first color and the second action is formatted in the second portion with a second color.

6. The system of claim 1, wherein the engagement index is a first engagement index and wherein the at least one processor is further configured to, when executing the instructions, to perform operations including:
   retrieving a second engagement index for the application, the second engagement index calculated in a prior period of time than the first engagement index.

7. The system of claim 6, wherein presenting the user interface further includes:
   presenting a fifth portion that graphically indicates a trend for a first action in the selection of actions from the first engagement index to the second engagement index.

8. The system of claim 1, wherein the at least one processor is further configured to, when executing the instructions, to perform operations including:
   retrieving a comparison engagement index for the application; and
   presenting components of the comparison engagement index in the user interface.

9. A computer-implemented method comprising:
   accessing, from a data store, telemetry data for an application, the telemetry data identifying actions executed by the application for a set of users of the application;
   retrieving an engagement index for the application using the telemetry data based on an engagement index profile, the engagement index profile identifying a selection of actions and a set of calculation dimensions; and
   presenting a user interface, the user interface including:
   a first portion identifying the selection of actions;
   a second portion identifying the set of calculation dimensions;
   a third portion identifying an original value of an action of the selection of actions with respect to a dimension in the set of calculation dimensions; and
   a fourth portion identifying a weighted composite value of the action with respect to set of calculation dimensions.

10. The computer-implemented method of claim 9, wherein a first action in the selection of actions is classified as a preferred action and a second action of the selection of action is classified as an unpreferred action.

11. The computer-implemented method of claim 10, wherein the engagement index is calculated based on applying a positive weight to dimension calculations for the first action and applying a negative weight to dimension calculations for the second action.

12. The computer-implemented method of claim 11, wherein a value of the positive weight is based on a supervised learning algorithm.

13. The computer-implemented method of claim 10, the first action is formatted in the first portion with a first color and the second action is formatted in the second portion with a second color.

14. The computer-implemented method of claim 9, wherein engagement index is a first engagement index and wherein the method further includes:
   retrieving a second engagement index for the application, the second engagement index calculated in a prior period of time than the first engagement index.

15. The computer-implemented method of claim 14, wherein presenting the user interface further includes:
   presenting a fifth portion that graphically indicates a trend for a first action in the selection of actions from the first engagement index to the second engagement index.

16. The computer-implemented method of claim 9, further comprising:
   retrieving a comparison engagement index for the application; and
   presenting components of the comparison engagement index in the user interface.

17. A non-transitory computer-readable medium comprising instructions, which when executed by at least one processor, configure the at least one processor to perform operations comprising:

accessing, from a data store, telemetry data for an application, the telemetry data identifying actions executed by the application for a set of users of the application;

retrieving an engagement index for the application using the telemetry data based on an engagement index profile, the engagement index profile identifying a selection of actions and a set of calculation dimensions; and     presenting a user interface, the user interface including:

a first portion identifying the selection of actions;

a second portion identifying the set of calculation dimensions;

a third portion identifying an original value of an action of the selection of actions with respect to a dimension in the set of calculation dimensions; and     a fourth portion identifying a weighted composite value of the action with respect to set of calculation dimensions.

18. The computer-readable medium of claim 17, wherein a first action in the selection of actions is classified as a preferred action and a second action of the selection of action is classified as an unpreferred action.

19. The computer-readable medium of claim 18, wherein the engagement index is calculated based on applying a positive weight to dimension calculations for the first action and applying a negative weight to dimension calculations for the second action.

20. The computer-readable medium of claim 19, wherein a value of the positive weight is based on a supervised learning algorithm.

* * * * *